July 8, 1952    M. N. WHITAKER    2,602,203
PROTECTOR FOR UPHOLSTERY TRIM BEADS
Filed April 25, 1950
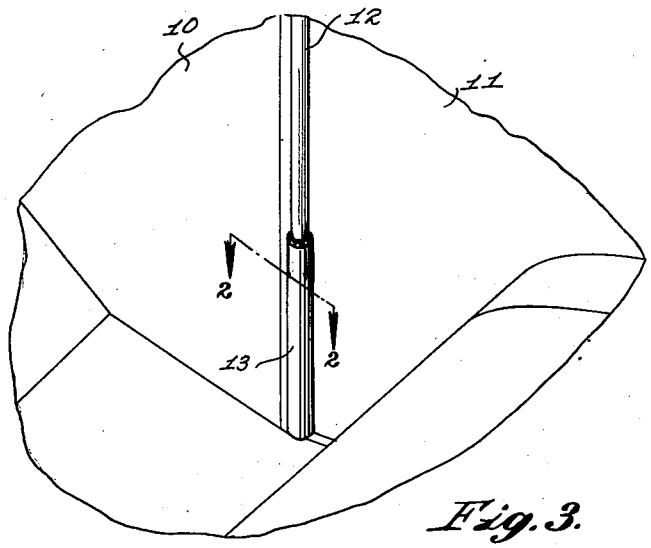
Fig.1.
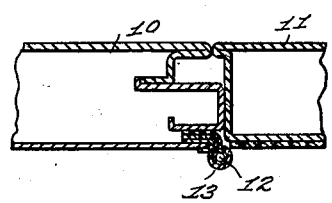
Fig.2.
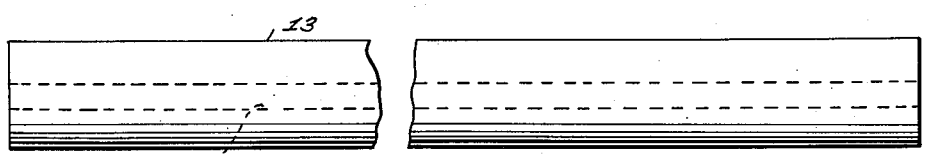
Fig.3.
Fig.4.    Fig.5.
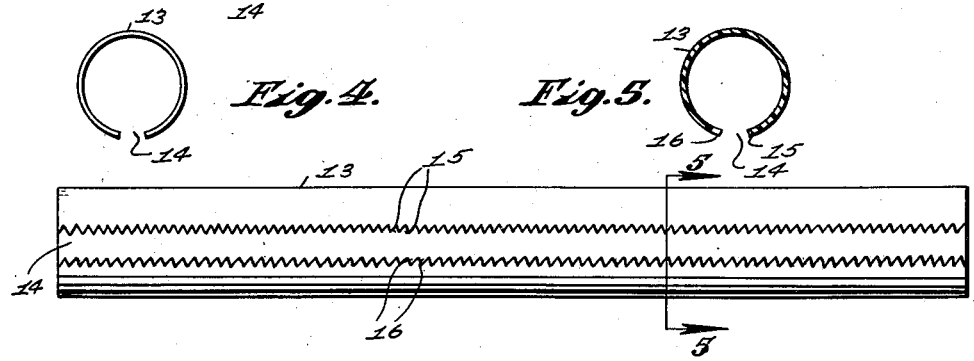
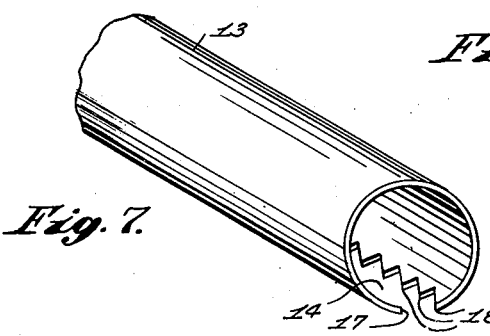
Fig.6.
Fig.7.
INVENTOR.
MACK N. WHITAKER
BY
McMorrow, Berman & Davidson
ATTORNEYS Patented July 8, 1952

2,602,203

UNITED STATES PATENT OFFICE 2,602,203

PROTECTOR FOR UPHOLSTERY TRIM BEADS

Mack N. Whitaker, Jackson, Tenn.

Application April 25, 1950, Serial No. 158,027

3 Claims. (Cl. 20—69)

This invention relates to protectors for upholstery trim beads, and more particularly to a protecting cover for the trim or wind beads disposed around the inner edges of the door openings in an automobile body.

It is among the objects of the invention to provide a protective covering for the trim beads of automobile bodies, which covering can be easily applied to the trim beads and firmly retains itself in place thereon to protect new beads or to cover and conceal, as well as protect, worn and soiled beads, which can be used to cover an entire bead or only a worn part or a part particularly subject to wear and soiling, as may be desired, which is neat and attractive when applied and can be made of transparent material to show the color and texture of the bead itself or can be made of an opaque material to conceal the bead, and which is economical to manufacture and can be applied to an upholstery bead with no modification of the bead construction.

Other objects and advantages will become apparent from a consideration of the following description and the appended claims in conjunction with the accompanying drawing, wherein:

Figure 1 is a perspective view of a fragmentary portion of the interior of an automobile body showing the manner of applying a protective covering illustrative of the invention to an upholstery trim bead;

Figure 2 is a fragmentary cross-sectional view on the line 2—2 of Figure 1;

Figure 3 is a longitudinal elevational view of a section of trim bead protector illustrative of the invention;

Figure 4 is an end elevation of the trim bead protector;

Figure 5 is a transverse cross-sectional view on the line 5—5 of Figure 3;

Figure 6 is a longitudinal elevational view of the side of the protector opposite that illustrated in Figure 3; and Figure 7 is a perspective view of a short section of a somewhat modified form of trim bead protector.

With continued reference to the drawing, Figures 1 and 2 illustrate a fragmentary portion of an automobile body including a side wall 10 having a door opening therein, a door 11 closing the opening and an upholstery trim bead or wind bead 12 extending around the edge of the door opening inside of the vehicle body.

This trim bead is a fabricated structure including a substantially cylindrical core of flexible material, such as sponge rubber, and a fabric covering surrounding the sponge rubber core and extending to one side of the core to provide an attaching strip or tab by means of which the trim bead is secured to the vehicle body and made an integral part of the body upholstery. The trim bead itself is generally cylindrical in shape and extends entirely around the door opening except for the bottom of the opening, the trim bead having its ends disposed at the bottom ends of the edges of the door opening.

The portion of the trim bead adjacent the bottom of the door opening is subject to very hard wear, as it is frequently kicked or scuffed by persons entering or leaving the automobile and is frequently soiled after a very short period of use of a new automobile. The protective cover of the present invention may be used in short lengths to protect and cover only the portions of the trim beads near the bottoms of the door opening, or, if desired, may be used to enclose and protect the entire length of each of the trim beads.

The protective covering is an elongated, substantially cylindrical tube 13 of thin-walled, flexible material having an inside diameter substantially the same as the outside diameter of the trim bead to which the cover is to be applied. The material, such as synthetic resin plastic, may be made transparent in order to show the color and texture of the trim bead which it covers or may be made opaque to conceal as well as protect the trim bead, and, if made opaque, may be suitably colored or otherwise decorated to provide an attractive appearance.

The tubular body 13 is provided with a longitudinally extending cut or slot 14 which extends entirely through the wall of the body and from one end of the body to the other so that the edges of the body at opposite sides of the cut may be sprung apart to permit the trim bead to pass through the opening thus provided and into the interior of the tubular body of the cover.

In the form of the invention shown in Figures 3 and 4, the edges of the cut are smooth and the covering is designed to clamp or grip the trim bead firmly and provide sufficient friction between itself and the trim bead to resist movement of the covering relative to the trim bead.

In the arrangement shown in Figures 4 and 5, the body is serrated along each edge of the cut, as indicated at 15 and 16, to provide small teeth, the points of which engage the fabric of the trim bead attaching strip or tab and assist in holding the covering in place on the trim bead.

In the further modified arrangement shown in

Figure 7, one side of the cut is left smooth, as indicated at 17, and the other side is serrated to provide a series of small teeth 18 for engaging the trim bead fabric and holding the cover firmly in place thereon.

If desired, portions of the cut may be left smooth and other portions serrated along the length of the tubular cover, the lengths of the smooth and serrated portions being dimensioned and proportioned as may be desired, or as may be found to provide the best results.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A protective cover for an upholstery trim bead comprising an elongated cylindrical tube of thin-walled resilient material having an inside diameter substantially the same as the outside diameter of an upholstery trim bead on which the cover is to be mounted and having a cut extending longitudinally thereof from one end to the other and entirely through the wall thereof so that the edges of the cover along opposite sides of the cut can be sprung apart to provide an opening through which a trim bead may pass to the interior of the cover, the resiliency of the material reducing this opening when the edge separating pressure is released and bringing the protective cover into close contact with an associated trim bead, said body being serrated along both sides of said cut to provide two opposed series of small teeth engageable with the material of a trim bead to assist in securing the cover against movement relative to a trim bead on which it is mounted.

2. A protective cover for an upholstery trim bead consisting only of an elongated cylindrical tube of thin-walled resilient material having an inside diameter substantially the same as the outside diameter of an upholstery trim bead on which the cover is to be mounted and having a cut extending longitudinally thereof from one end to the other and entirely through the wall thereof so that the edges of the cover along opposite sides of the cut can be sprung apart to provide an opening through which a trim bead may pass to the interior of the cover, the resiliency of the material reducing this opening when the edge separating pressure is released and causing said tube to engage said trim bead snugly substantially entirely therearound, and said tube being of sufficient length that the edge grip on the bead avoids undesired slipping of the cover device longitudinally.

3. A protective cover for an upholstery trim bead comprising an elongated cylindrical tube of thin-walled resilient material having an inside diameter substantially the same as the outside diameter of an upholstery trim bead on which the cover is to be mounted and having a cut extending longitudinally thereof from one end to the other and entirely through the wall thereof so that the edges of the cover along opposite sides of the cut can be sprung apart to provide an opening through which a trim bead may pass to the interior of the cover, the resiliency of the material reducing this opening when the edge separating pressure is released and bringing said protective cover into close contact with an associated trim bead, said body having tooth means on at least one edge of said cut engageable with the material of the trim bead to assist in maintaining the cover against movement relative to a trim bead on which it is mounted.

MACK N. WHITAKER.

REFERENCES CITED

The following references are of record in the file of this patent:

UNITED STATES PATENTS

| Number | Name | Date |
| --- | --- | --- |
| Re. 20,911 | Rydquist | Nov. 8, 1938 |
| 2,319,445 | Crowe | May 18, 1943 |

FOREIGN PATENTS

| Number | Country | Date |
| --- | --- | --- |
| 800,639 | France | May 4, 1936 |